United States Patent [19]
Chen

[11] Patent Number: 5,746,440
[45] Date of Patent: May 5, 1998

[54] LUGGAGE CARRIER

[76] Inventor: Guan-Zhon Chen, No. 13, Lane 430, Section 2, Yuan Lu Road, Yi Min Tsuen, Pu Hsin Hsiang, Chang Hua Hsien, Taiwan

[21] Appl. No.: 642,951

[22] Filed: May 6, 1996

[51] Int. Cl.⁶ .................................................. B62B 1/00
[52] U.S. Cl. .......................... 280/652; 280/47.17; 280/655
[58] Field of Search ...................................... 280/652, 655, 280/655.1, 654, 659, 47.17, 47.18, 47.29, 47.315

[56] References Cited

U.S. PATENT DOCUMENTS

| | | | |
|---|---|---|---|
| 4,887,835 | 12/1989 | Dallaire et al. | 280/655 X |
| 5,127,664 | 7/1992 | Cheng | 280/655 |
| 5,519,919 | 5/1996 | Lee | 280/655 X |

FOREIGN PATENT DOCUMENTS 404183673  6/1992  Japan ................................. 280/655

Primary Examiner—Robert J. Oberleitiner
Assistant Examiner—Pamela J. Lipka
Attorney, Agent, or Firm—Charles E. Baxley

[57] ABSTRACT

A luggage carrier includes two inner tubes slidably engaged in two outer tubes. A rod is engaged in one outer tube and has a lower end secured to the outer tube. A resilient blade is secured to the lower portion of one inner tube and has two orifices for engaging with the rod. The interior walls bounding the orifices may engage with the rod so as to secure the resilient blade to the rod and may be disengaged from the rod so as to allow the inner tubes to be adjusted relative to the outer tubes when the resilient blade is actuated.

4 Claims, 4 Drawing Sheets

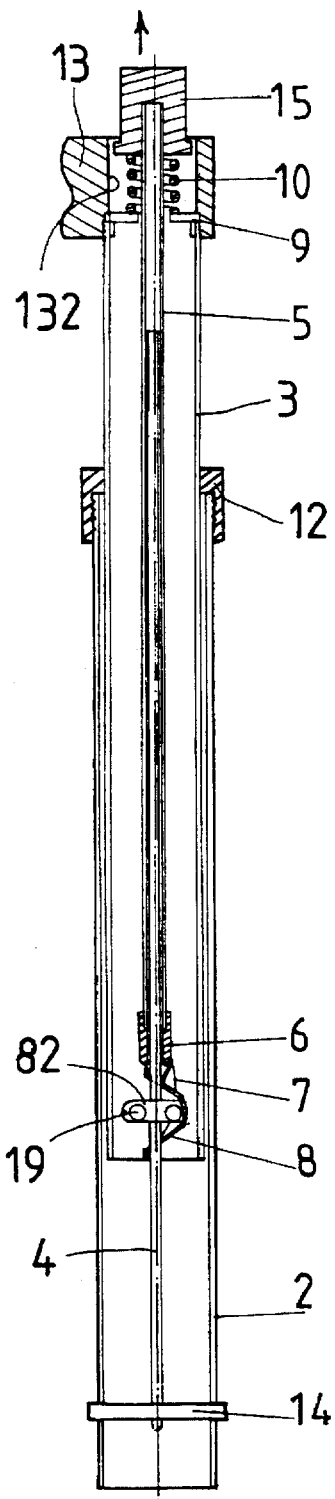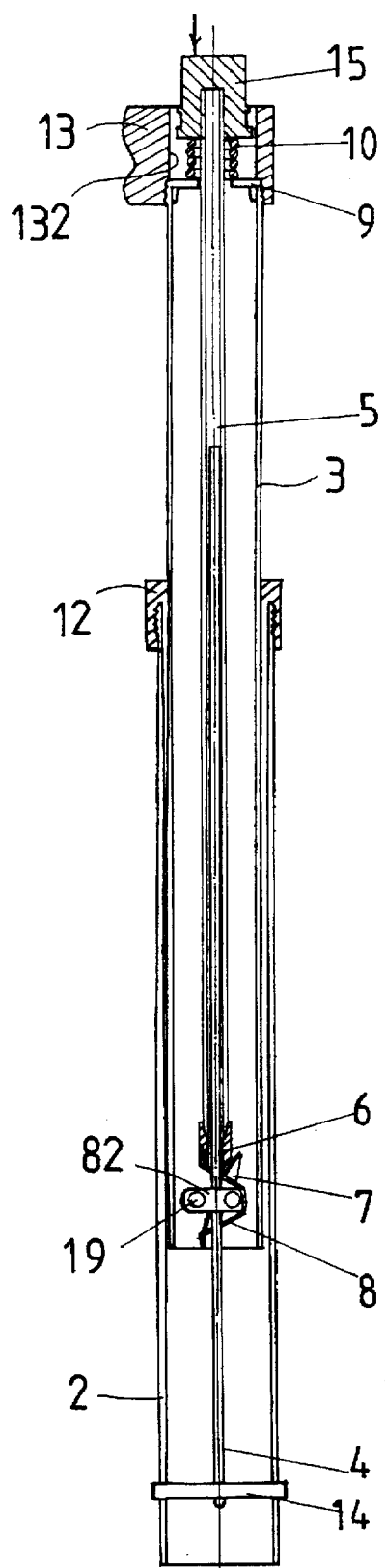

५,७४६,४४०

LUGGAGE CARRIER

BACKGROUND OF THE INVENTION

1. Field of the Invention

The present invention relates to a carrier, and more particularly to a luggage carrier.

2. Description of the Prior Art

Various kinds of luggage carriers have been developed for carrying luggage and the like. Several of the luggage carriers are disclosed in U.S. Pat. No. 10 3,998,476 to Kazmark, Sr., U.S. Pat. No. 4,896,897 to Wilhelm, U.S. Pat. No. 5,127,664 to Cheng, U.S. Pat. No. 5,257,800 to Yang, U.S. Pat. No. 5,308,103 to ChinShung, U.S. Pat. No. 5,351,984 to Cheng, and U.S. Pat. No. 5,367,743 to Chang. All of the luggage carriers comprise a latch that is required to be engaged in either of the holes of the tubes so as to secure the inner and outer tubes together. The inner and outer tubes may not be adjusted to each other freely.

The present invention has arisen to mitigate and/or obviate the afore-described disadvantages of the conventional luggage carriers.

SUMMARY OF THE INVENTION

The primary objective of the present invention is to provide a luggage carrier which includes an inner tube that may be adjusted to any suitable position relative to the outer tube.

In accordance with one aspect of the invention, there is provided a luggage carrier comprising a base including two side portions, two outer tubes each including a lower end secured to the side portions of the base and each including an upper portion, a bar secured to the upper portions of the outer tubes, a rod engaged in a first of the outer tubes and including a lower end secured to the lower end of the first outer tube, two inner tubes each including a lower portion slidably engaged in the outer tubes and each including an upper portion, a first of the inner tubes being slidably engaged in the first outer tube and including a lower portion, a hand grip secured to the upper portion of the inner tubes, a resilient blade secured to the lower portion of the first inner tube and including at least one orifice formed therein and defined by an interior wall for engaging with the rod, the interior wall of the resilient blade being engaged with the rod so as to be secured to the rod, the orifice including a size slightly larger than that of the rod, and means for disengaging the interior wall of the orifice from the rod so as to allow the first inner tube to be adjusted relative to the rod and the first outer tube.

The first outer tube includes a pin secured to the lower end thereof, the lower end of the rod is secured to the pin.

The resilient blade includes an upper portion and a lower portion and includes two orifices formed in the upper portion and the lower portion respectively and defined by interior walls respectively, the resilient blade includes a lower end and an upper end, the disengaging means includes a follower pivotally secured to the lower portion of the first inner tube and having an opening formed therein for engaging with the rod, the follower includes a lower end engaged with the lower end of the resilient blade and includes an upper end arranged closer to the upper end of the resilient blade, the disengaging means further includes a means for separating the upper ends of the follower and the resilient blade away from each other so as to disengage the interior walls of the orifices from the rod.

The hand grip includes a puncture formed therein and aligned with the first inner tube, a knob is slidably engaged in the puncture, a pipe is slidably engaged on the rod and includes an upper end secured to the knob and includes a lower end, and a biasing means is provided for biasing the knob partially outward of the hand grip, the lower end of the pipe is the separating means and is provided for disengaging the interior walls of the orifices from the rod when the pipe is moved toward the resilient blade by the knob.

The resilient blade includes a middle portion having two arms extended therefrom, and at least one pin engaged with the arms and the lower portion of the first inner tube so as to secure the resilient blade to the lower portion of the first inner tube.

Further objectives and advantages of the present invention will become apparent from a careful reading of a detailed description provided hereinbelow, with appropriate reference to accompanying drawings.

BRIEF DESCRIPTION OF THE DRAWINGS

FIGS. 3 and 4 are cross sectional views illustrating the operation between the inner and outer tubes;

DETAILED DESCRIPTION OF THE PREFERRED EMBODIMENT

Figure 1:
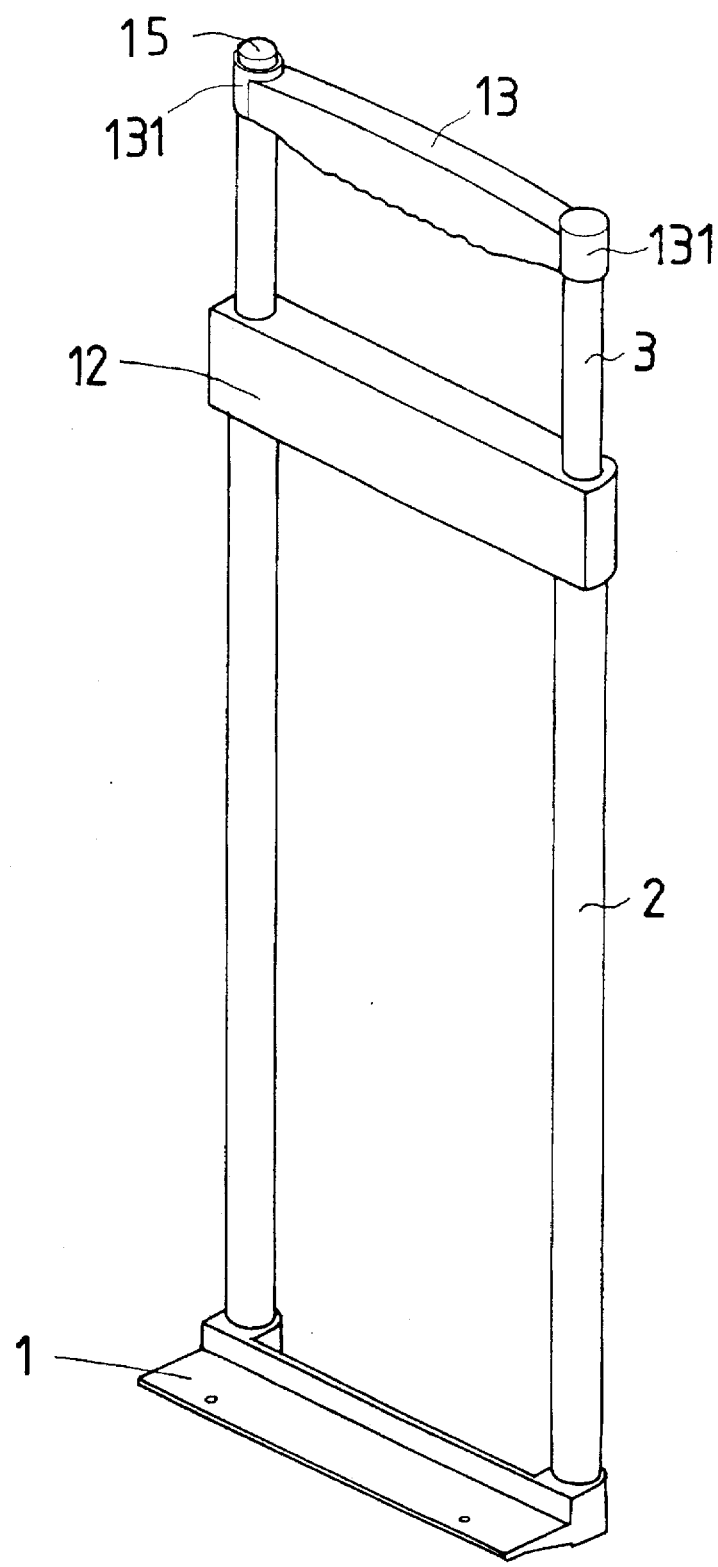
FIG. 1 is a perspective view of a luggage carrier in accordance with the present invention.
Figure 2:
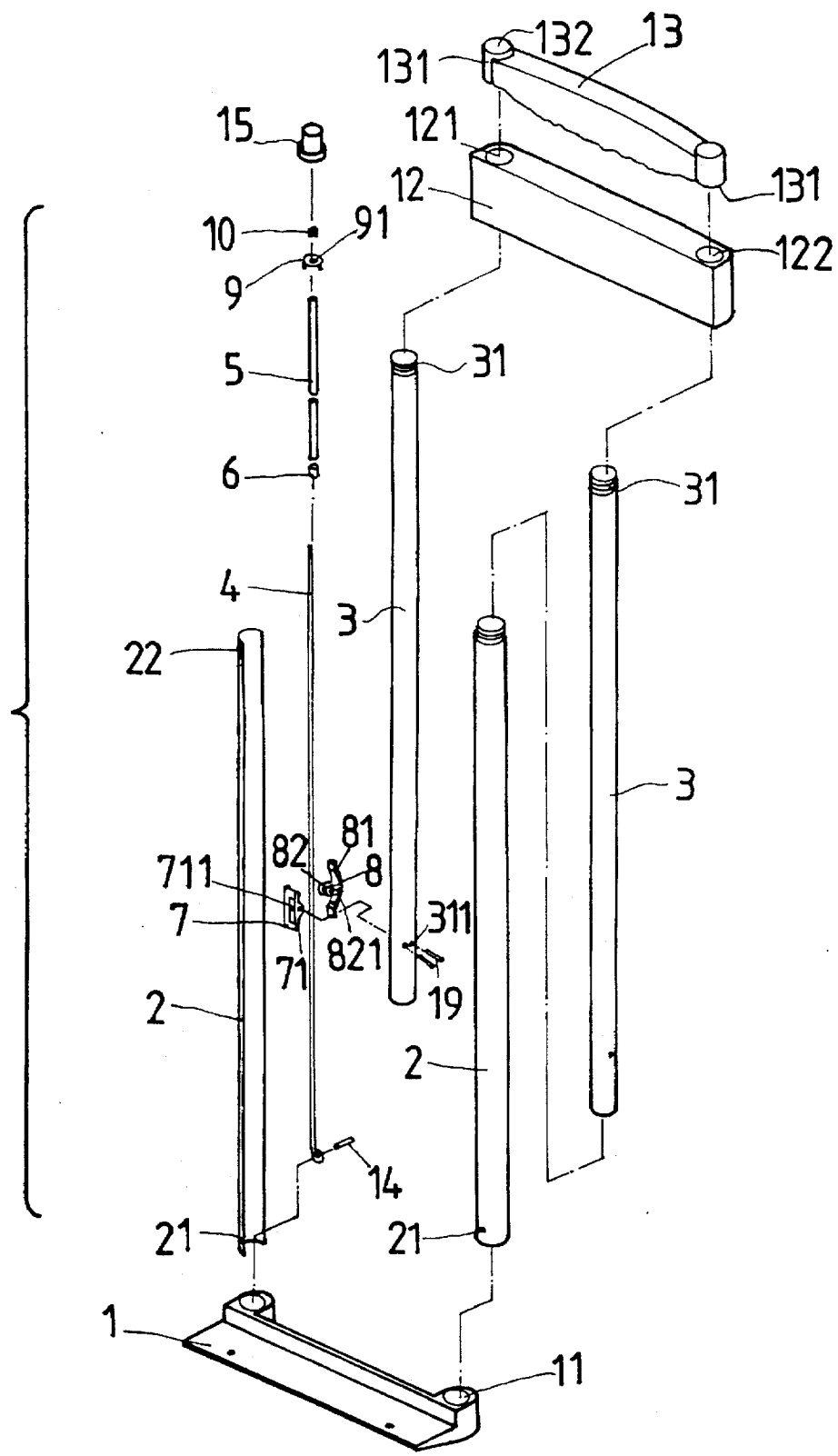
FIG. 2 is an exploded view of the luggage carrier.
Figures 5, 6:
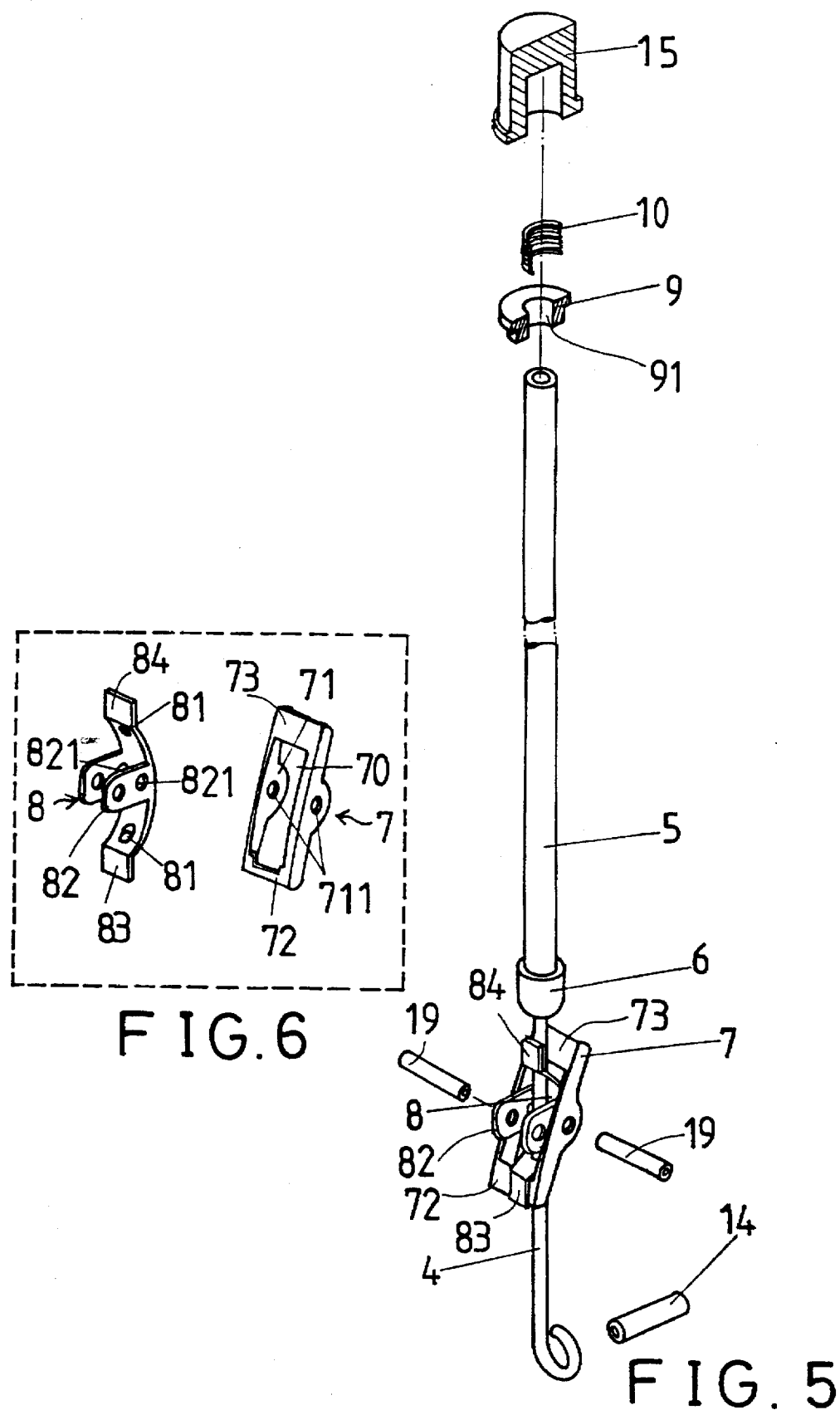
FIG. 5 is a partial exploded view illustrating the actuating members.
FIG. 6 is a perspective view illustrating a spring and a follower of the actuating members.

Referring to the drawings, and initially to FIGS. 1 to 3, a luggage carrier in accordance with the present invention comprises a base 1 including two holes 11 formed in two side portions thereof. Two outer tubes 2 each includes a lower end engaged in the respective holes 11 and each includes a hole 21 formed in the lower end for engaging with a pin 14 which may secure the lower ends of the outer tubes 2 to the base 1. The outer tubes 2 each includes an outer thread 22 formed in the upper end thereof. A bar 12 includes two openings 121, 122 formed in the end portions each of which has an inner thread formed therein for engaging with the outer thread 22 of the outer tubes 2 such that the bar 12 may be secured on top of the outer tubes 2. A rod 4 is engaged in one of the outer tubes 2 and includes a lower end secured to the pin 14.

Two inner tubes 3 each has a lower portion slidably engaged in the respective outer tubes 2 and each includes an outer thread 31 formed in the upper portion for threadedly engaging with two end portions 131 of a hand grip 13. One of the end portions 131 of the hand grip 13 includes a puncture 132 formed therein. A pipe 5 is slidably engaged on the rod 4 and includes a pusher 6 secured to the lower end thereof. A cap 9 is secured on top of each of the inner tubes 3 and each includes an aperture 91 formed therein for engaging with the pipe 5. A knob 15 is secured on top of the pipe 5. A spring 10 is engaged between the knob 15 and the cap 9 for biasing the knob 15 partially outward of the hand grip 13.

As best shown in FIGS. 2 to 6, a resilient blade 8 includes a curved configuration having two orifices 81 formed in the upper and the lower portions for engaging with the rod 4. The resilient blade 8 includes a lower end 83, an upper end 84 and includes a pair of arms 82 extended therefrom. The arms 82 each includes two holes 821 formed therein for engaging with pins 19 which are engaged with the inner tube 3 so as to secure the resilient blade 8 to the inner tube 3. A follower 7 includes an opening 70 formed therein for engaging with the rod 4 and includes two walls 71 each having a hole 711 for engaging with one of the pins 19 such that the follower 7 may be pivotally coupled to the inner tube 3. The follower 7 includes a lower end 72 engaged with the lower end 83 of the resilient blade 8 and includes an upper end 73 arranged closer to the upper end 84 of the resilient blade 8 for engaging with the pusher 6.

It is to be noted that the orifices 81 of the resilient blade 8 include a size slightly larger than the outer diameter of the rod 4 for allowing the rod 4 to be slidable relative to the resilient blade 8 when the two ends 83, 84 of the resilient blade 8 are moved toward each other. However, the resilient blade 8 which is secured to the inner tube 3 may engage with the rod 4; i.e., the interior walls bounding the orifices 81 may engage with the rod 4 so as to secure the inner tube 3 to the rod 4 and the outer tube 2, as best shown in FIG. 3.

In operation, as shown in FIG. 4, when the pusher 6 and the pipe 5 are pushed downward relative to the rod 4 by the knob 15, the upper ends 73, 84 of the follower 7 and the resilient blade 8 may be moved away from each other. At this moment, the upper end 84 and the lower end 83 of the resilient blade 8 may be moved toward each other by the pusher 6 and the follower 8 so as to align the rod 4 with the orifices 81 of the resilient blade 8 and so as to disengage the resilient blade 8 from the rod 4 such that the pipe 5 and the inner tube 3 may move freely relative to the rod 4 and the outer tube 2 respectively. The resilient blade 8 may engage with the rod 4 again when the knob 15 is released. It is only required to depress the knob 15 in order to disengage the resilient blade 8 from the rod 4 and so as to allow the inner tubes 3 to be moved and adjusted relative to the outer tubes 2.

Accordingly, the luggage carrier in accordance with the present invention includes an inner tube that may be easily and quickly adjusted to any suitable position relative to the outer tube.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A luggage carrier comprising:

a base including two side portions, two outer tubes each including a lower end secured to said side portions of said base and each including an upper portion, a bar secured to said upper portions of said outer tubes a rod engaged in a first of said outer tubes and including a lower end secured to said lower end of said first outer tube, said first outer tube including a pin secured to said lower end thereof, said lower end of said rod being secured to said pin, two inner tubes each including a lower portion slidably engaged in said outer tubes and each including an upper portion, a first of said inner tubes being slidably engaged in said first outer tube and including a lower portion, a hand grip secured to said upper portion of said inner tubes, a resilient blade secured to said lower portion of said first inner tube and including at least one orifice including an interior wall for engaging with and for securing to said rod, said orifice including a size slightly larger than that of said rod, and means for disengaging said interior wall of said orifice from said rod so as to allow said first inner tube to be adjusted relative to said rod and said first outer tube.

2. A luggage carrier comprising:

a base including two side portions, two outer tubes each including a lower end secured to said side portions of said base and each including an upper portion, a bar secured to said upper portions of said outer tubes, a rod engaged in a first of said outer tubes and including a lower end secured to said lower end of said first outer tube, two inner tubes each including a lower portion slidably engaged in said outer tubes and each including an upper portion, a first of said inner tubes being slidably engaged in said first outer tube and including a lower portion, a hand grip secured to said upper portion of said inner tubes, a resilient blade secured to said lower portion of said first inner tube, said resilient blade including an upper portion and a lower portion and including two orifices formed in said upper portion and said lower portion respectively and defined by interior walls respectively, said resilient blade including a lower end and an upper end, said orifices including a size slightly larger than that of said rod, said interior walls being provided for engaging with and for securing to said rod, and means for disengaging said interior wall of said orifice from said rod so as to allow said first inner tube to be adjusted relative to said rod and said first outer tube, said disengaging means including a follower pivotally secured to said lower portion of said first inner tube and having an opening formed therein for engaging with said rod, said follower including a lower end engaged with said lower end of said resilient blade and including an upper end arranged closer to said upper end of said resilient blade, said disengaging means further including a means for separating said upper ends of said follower and said resilient blade away from each other so as to disengage said interior walls of said orifices from said rod.

3. A luggage carrier according to claim 2, wherein said hand grip includes a puncture formed therein and aligned with said first inner tube, a knob is slidably engaged in said puncture, a pipe is slidably engaged on said rod and includes an upper end secured to said knob and includes a lower end, and a biasing means is provided for biasing said knob partially outward of said hand grip, said lower end of said pipe is said separating means and is provided for disengaging said interior walls of said orifices from said rod when said pipe is moved toward said resilient blade by said knob.

4. A luggage carrier comprising:

a base including two side portions, two outer tubes each including a lower end secured to said side portions of said base and each including an upper portion, a bar secured to said upper portions of said outer tubes, a rod engaged in a first of said outer tubes and including a lower end secured to said lower end of said first outer tube, two inner tubes each including a lower portion slidably engaged in said outer tubes and each including an upper portion, a first of said inner tubes being slidably engaged in said first outer tube and including a lower portion, a hand grip secured to said upper portion of said inner tubes, a resilient blade secured to said lower portion of said first inner tube and including at least one orifice including an interior wall for engaging with and for securing to said rod, said orifice including a size slightly larger than that of said rod, said resilient blade including a middle portion having two arms extended therefrom, and at least one pin engaged with said arms and said lower portion of said first inner tube so as to secure said resilient blade to said lower portion of said first inner tubes, means for disengaging said interior wall of said orifice from said rod so as to allow said first inner tube to be adjusted relative to said rod and said first outer tube.

* * * * *